Dec. 8, 1964

J. C. WIDMAN ETAL 3,160,338

GLASS PANEL IMPACT DEVICE

Filed May 15, 1963

JOHN C. WIDMAN
ERWIN J. MARYNOWSKI
INVENTORS

BY

ATTORNEYS

JOHN C. WIDMAN
ERWIN J. MARYNOWSKI
INVENTORS

ATTORNEYS

Dec. 8, 1964   J. C. WIDMAN ETAL   3,160,338
GLASS PANEL IMPACT DEVICE
Filed May 15, 1963   4 Sheets-Sheet 3

JOHN C. WIDMAN
ERWIN J. MARYNOWSKI
INVENTORS
ATTORNEYS

Dec. 8, 1964 — J. C. WIDMAN ETAL — 3,160,338
GLASS PANEL IMPACT DEVICE
Filed May 15, 1963 — 4 Sheets-Sheet 4

JOHN C. WIDMAN
ERWIN J. MARYNOWSKI
INVENTORS

United States Patent Office 3,160,338
Patented Dec. 8, 1964

3,160,338
GLASS PANEL IMPACT DEVICE
John C. Widman, Royal Oak, and Erwin J. Marynowski, Wyandotte, Mich., assignors to Ford Motor Company, Dearborn, Mich., a corporation of Delaware
Filed May 15, 1963, Ser. No. 280,614
14 Claims. (Cl. 225—93)

This invention relates to impact devices which may be actuated to deliberately shatter a glass panel to provide an emergency opening in a wall, door or like structure.

More particularly, the present invention relates to impact devices adapted upon deliberate actuation to shatter the window glass in vehicle body panels. Most motor vehicles are provided with side windows manufactured from heat treated or tempered glass and windshields fabricated from laminated sheet or plate glass. Both of these types of glass meet the American Standard Safety Code for Safety Glazing Material for Motor Vehicles.

Tempered safety glass consists of a single heat treated panel which, when its skin is pierced at any point, will immediately break into innumerable small pieces without jagged edges. This glass can only be broken by a sharp instrument but when broken provides a large opening equal to the area of the frame in which it was mounted. This is not a characteristic of the laminated glass used in vehicle windshields. Laminated glass will crack and break under impact, but the pieces of the glass tend to adhere to the plastic sheet. The braking of laminated glass in an emergency may not provide a large enough opening to permit egress from the vehicle. Even if the opening is large enough, the jagged edges of the broken laminated glass still adhering to the plastic layer may cause severe cuts when the occupants of the vehicle try to escape through the broken window.

The shattering or breaking of a closed window of the vehicle may be desirable under certain emergency conditions. In case of collision, it is very probable that the doors are jammed in a closed position and that the window-operating mechanisms have become inoperable. Thus, the only egress from the vehicle can be effected by the breaking of its glass windows.

Further, when a motor vehicle falls into deep water, the only means of escape for the occupants trapped inside may be through a broken window. Another reason for shattering the window in a hurry may exist when the occupant of the vehicle is partially overcome by carbon monoxide and is too weak to open either the door or the window.

It is an object of the present invention to provide impact devices particularly adapted to shatter heat treated or tempered window glass to provide an emergency opening in an enclosed structure such as a vehicle passenger compartment.

The impact devices embodying the present invention comprise an impact member and means for supporting the impact member for movement to a point of impact in a trajectory substantially normal to the plane of the glass panel. An impact energy imparting means, upon being actuated by the occupant, drives the impact member into the glass panel to cause the latter to shatter to provide fresh air or quick egress from the vehicle for the occupants thereof in case of emergency.

The application of the impact devices of this invention to motor vehicles will permit the greater utilization of tempered safety glass for side windows with resultant savings to the owner of the vehicle. Besides being lower in cost, tempered glass panels require very little replacement as such glass is very seldom broken under normal use.

The impact devices of this invention readily lend themselves to installation in commercial vehicles. Present Government regulations do not permit the use of tempered glass in side windows to be installed in cabs of commercial vehicles, an egress from truck cabs is unduly restricted in case of collision or other mishaps because of the few windows available for escape. An impact device according to any of the embodiments of this invention will provide the driver with a means to quickly shatter the window in the cab in case of emergency.

It is a further object of this invention to provide impact devices which can be installed at a relatively low cost in motor vehicles utilizing tempered glass panels in side window construction.

It is still a further object of this invention to provide impact devices which are readily accessible and can be quickly actuated by the occupant in order to shatter any closed window equipped with tempered glass to provide emergency egress from the motor vehicle.

Other objects, advantages and features of the present invention will become more apparent as this description proceeds, particularly when considered in connection with the accompanying drawings, in which.

Figures 1, 2, 3:
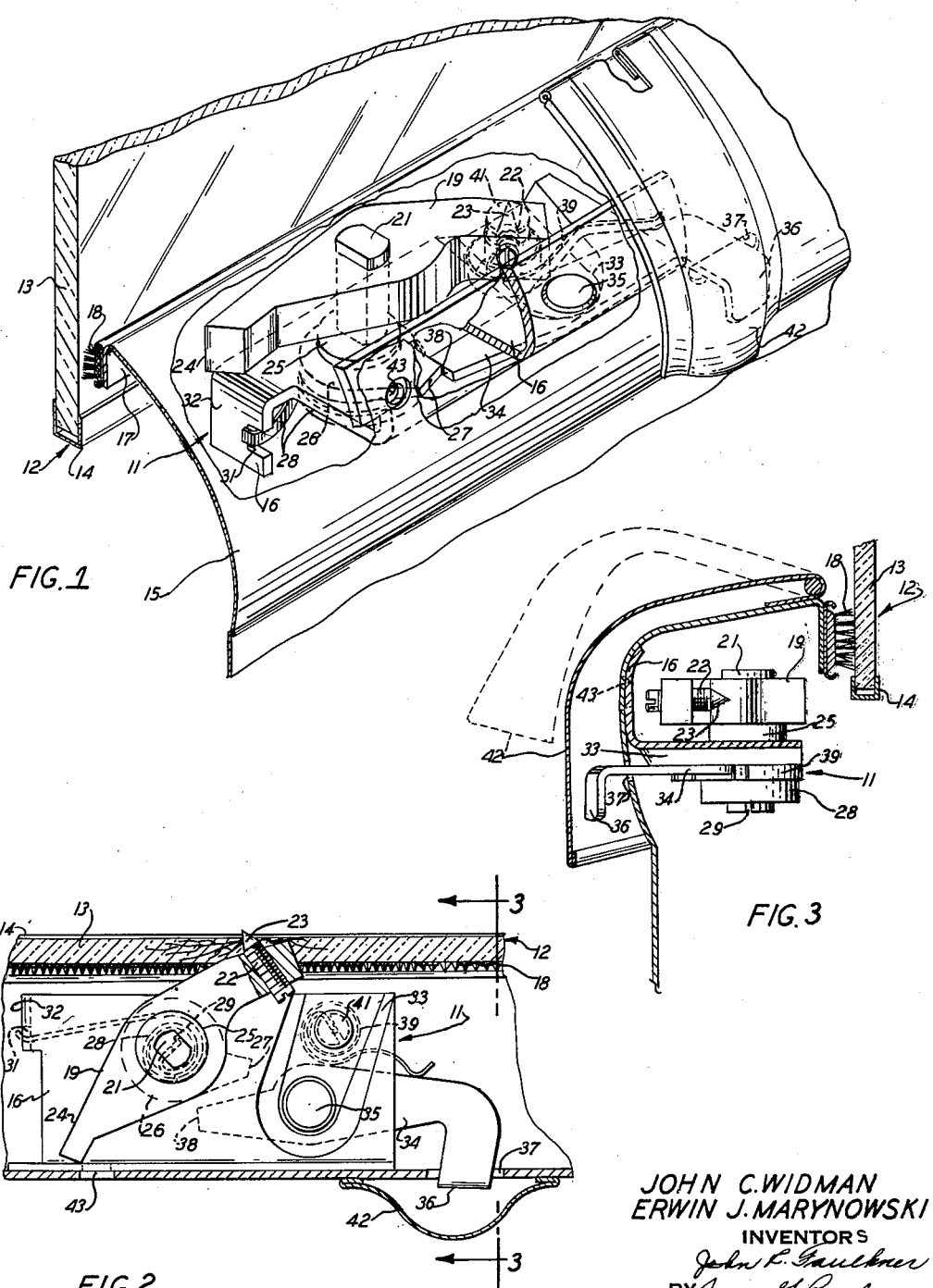
FIGURE 1 is a perspective view of an impact device of a first embodiment of this invention shown mounted in a vehicle, the mechanism being shown in a cocked position ready for actuation to shatter a glass panel.
FIGURE 2 is a plan view depicting the impact member of FIGURE 1 at the moment of impact with the glass panel.
FIGURE 3 is a sectional view taken along line 3—3 of FIGURE 2.

Referring now to the drawings, especially to FIGURES 1 through 3, there can be seen an impact device of a first embodiment of this invention, generally designated as 11. Adjacent the impact device 11 is seen a vehicle window 12 which includes a glass panel 13 carried in a frame 14. The glass panel 13 is formed from heat treated sheet or plate glass, also known as tempered glass, which is characterized by its tendency to shatter when its skin is penetrated by a striking object applied in a direction substantially normal to the plane of the glass panel 13.

An interior lower garnish molding 15 houses the impact device 11 which is supported therefrom by a support plate 16 fastened to the interior surface of the molding 15 by welding or other means. The garnish molding 15 has a downwardly extending flange 17 at its upper edge to support a pile sealing strip 18 abutting the interior surface of the glass panel 13.

The impact device 11 comprises an impact member 19 coupled to a shaft 21 extending through the support plate 16. One end of the impact member 19 threadingly receives a breaker pin 22. The breaker pin 22 has a sharply pointed end 23 which extends outward from the impact member 19. The other end of the impact member 19 is provided with a terminal shank portion 24 to assist spring loading the impact member 19 as will be hereinafter described.

As best seen in FIGURE 3, a washer 25 is securely attached to the shaft 21 and disposed intermediate the impact member 19 and the support plate 16. A ratchet plate 26, which is fixedly coupled to the shaft 21 below the support plate 16, has an outwardly extending abutment portion 27. A spiral spring means 28 encircles the shaft 21 below the ratchet plate 26 and has one of its ends extending through a diametrical slot 29 cut into the bottom of the shaft 21. The other end of the spiral spring means 28 is held in a notch 31 cut into a flange 32 extending downwardly from the edge of the support plate 16. The spiral spring means 28 normally biases the shaft 21 so that the pointed end 23 of the breaker pin 22 swings towards the glass panel 13 to penetrate the latter when the impact member 19 is uncocked, as best seen in FIGURE 2.

The support plate 16 is provided with a recessed portion 33. A pawl 34 is positioned below and pivotally connected to the recessed portion 33 by a pivot pin 35. The pawl 34 has a handle portion 36 at one end which extends outwardly through an opening 37 in the garnish molding 15. The other end of the pawl 34 is provided with an abutment engageable portion 38 which, upon engagement with the abutment portion 27 of the ratchet plate 26 will maintain the impact member 19 in a cocked or retracted position as seen in FIGURES 1 and 3. A second spiral spring 39 has one end attached to the underside of the recessed portion 33 by a rivet 41. The other end of the spiral spring 39 biases the pawl 34 so that the handle portion 36 extends outwardly from the garnish molding 15 in its normal position.

A spring loaded, generally U-shaped cover 42, is attached to the top edge of the garnish molding 15 and extends downwardly therefrom along the surface of the garnish molding 15 to enclose the handle portion 36. The cover 42 prevents the accidental actuation of the pawl 34 by the occupant of the vehicle. In normal operation, the cover 42 will have to be effectively lifted upwardly, as shown in dotted outline in FIGURE 3, before the handle portion 36 is exposed to permit the actuation of the impact member 19.

From this description it can be readily understood that in order to shatter the glass panel 13 in a motor vehicle window in case of emergency, the occupant has to lift the cover 42 and push the handle portion 36 towards the window 12. This will release the impact member 19 from its cocked position as seen in FIGURE 1 as the abutment portion 27 of the ratchet plate 26 will be disengaged by the abutment engageable portion 38 of the pawl 34. The spring loaded impact member 19 will rotate counterclockwise upon being released so that the pointed portion 23 of the breaker pin 22 will penetrate the skin of the tempered glass panel as seen in FIGURE 2. This will result in the complete shattering of the tempered glass panel 13.

The impact member 19 can be returned to its cocked position by inserting a screwdriver or other elongated tool through an opening 43 in the garnish molding 15. The end of the tool is utilized to exert pressure on the terminal shank portion 24 of the impact member 19 to retract the latter until the abutment portion 27 engages the abutment engageable portion 38 of the pawl 34 to place the impact member 19 in a cocked position.

Figure 4:
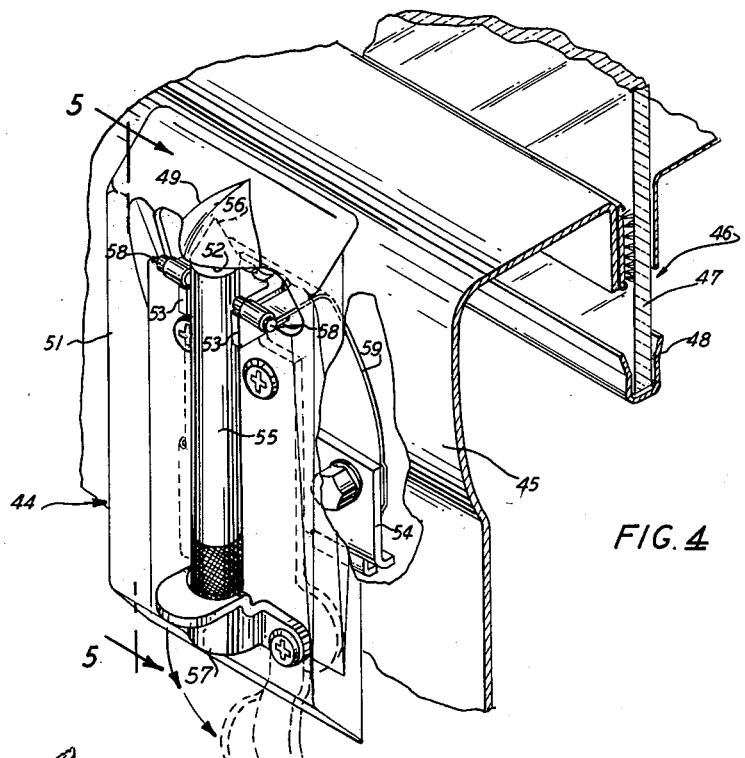
FIGURE 4 is a perspective view, partially in section, of an impact device of a second embodiment of this invention, the device being shown in a cocked position.
Figure 5:
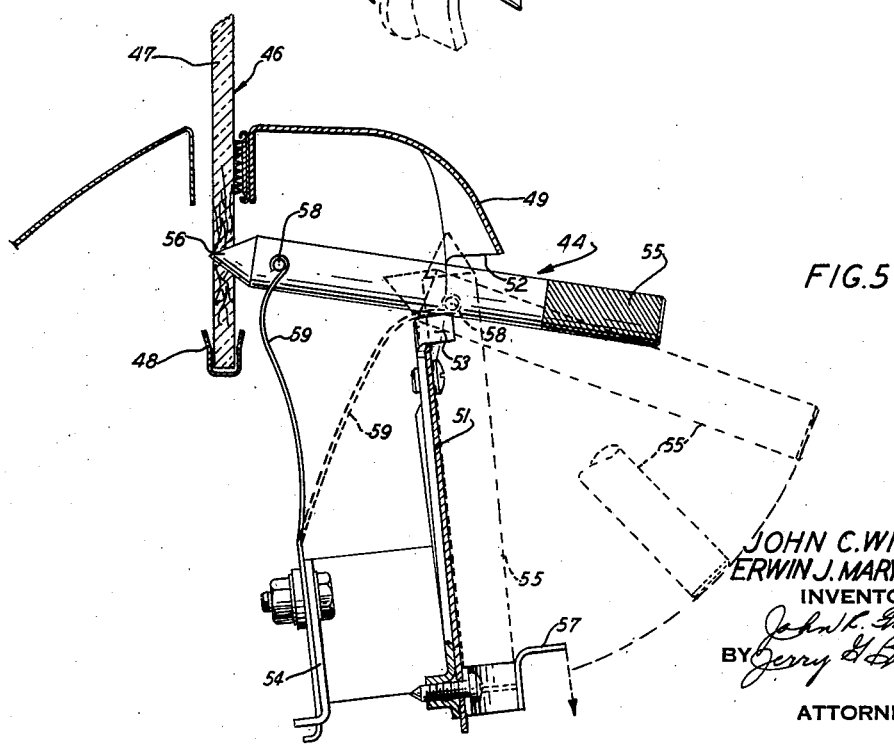
FIGURE 5 is a sectional view taken along line 5—5 of FIGURE 4 after the impact device has reached its point of impact with the glass panel.

In FIGURES 4 and 5 of the drawing is seen an impact device of a second embodiment of this invention, generally designated as 44. The impact device 44 is mounted on a modified interior garnish molding 45 juxtapositioned to a window 46 in a motor vehicle. The window 46 includes a tempered glass panel 47 mounted in a frame 48. The garnish molding 45 is formed with a hooded portion 49 that extends over an interior facing vertical portion 51 of the garnish molding 45.

An opening 52 is provided in the vertical portion 51 just below the hooded portion 49. A pair of horizontally spaced guides 53 extend outwardly from the vertical portion 51 on opposite sides of the opening 52. A bracket 54 is attached to the lower portion of the garnish molding 45 so that it is in juxtaposition to the tempered glass panel 47. An impact member 55 having a pointed end portion 56 is mounted in a vertical position in abutment with the vertical portion 51 of the garnish molding 45. The impact member 55 is positioned intermediate the guides 53 with its pointed portion 56 covered by the hooded portion 49 as best seen in FIGURE 4.

The bottom of the impact member 55 is received in a U-shaped clip 57 which is swingably connected to the garnish molding 45. Laterally extending pins 58 project from each side of the impact member 55 below its pointed end portion 56 with each projecting pin resting on guides 53. A pair of flat spring elements 59 are provided to attach the impact member 55 to the garnish molding 45. One end of each spring element 59 is connected to pins 58 while its other end is attached to the bracket 54. The spring elements 59 are in a cocked position when the impact member 55 is retained in its vertical position by the U-shaped clip 57 as seen in FIGURE 4.

When the clip 57 is swung in a downward direction, the pair of flat spring elements 59 will drive the impact member 55 towards the glass panel 47 with a sufficient force so that the pointed end portion 56 will penetrate the skin of the glass panel 47 in a direction substantially normal to the plane of the panel 47. This movement of the impact member 55 is shown in dotted lines in FIGURE 5. The tempered glass panel 47 will shatter upon penetration thereof by the pointed end portion 56 of the impact member 55.

Figure 6:
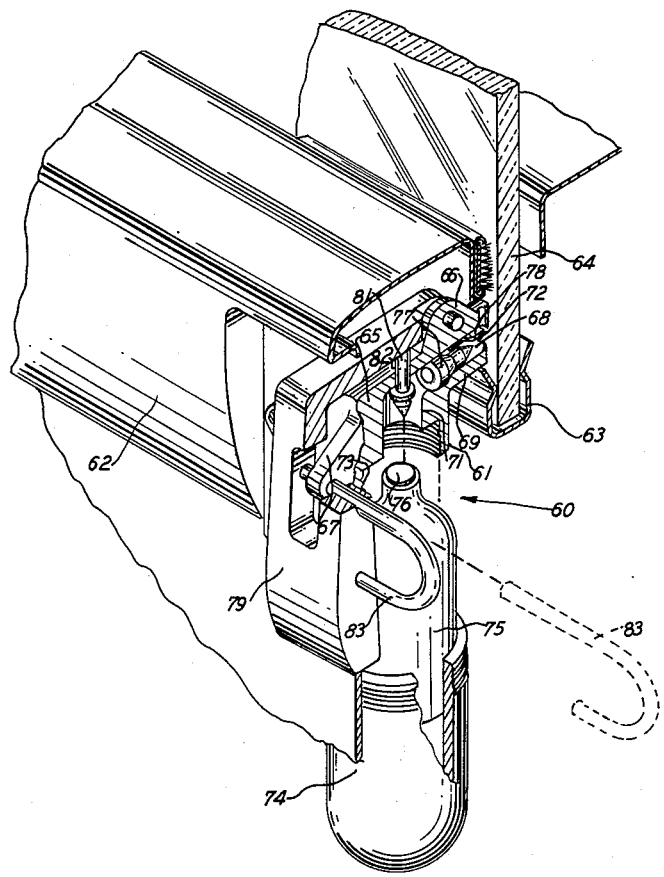
FIGURE 6 is a perspective view, partially in section, of an impact device of a third embodiment of this invention with a pellet of the impact device shown in a retracted position.
Figure 7:
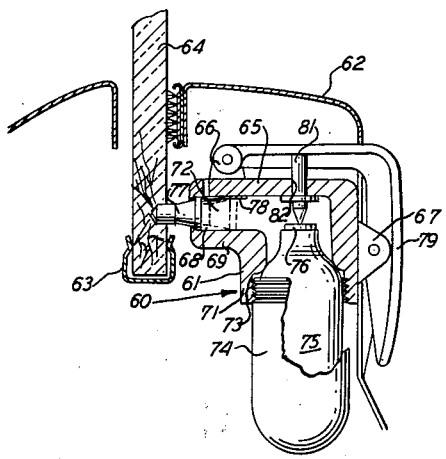
FIGURE 7 is a sectional view taken along line 7—7 of FIGURE 6 with the pellet of FIGURE 6 in its impact position with the glass panel.

In FIGURES 6 and 7 is seen an impact device of a third embodiment of this invention generally designated as 60. The impact device 60 includes a housing 61 attached to an inner garnish molding 62 in a juxtapositioned relationship with the window frame 63 supporting a tempered glass panel 64. The housing 61 comprises a body portion 65 having a hinge support 66 and a flange 67. An internal passageway 68 in the body portion 65 has a horizontal portion 69 and a vertical portion 71. The horizontal portion 69 terminates in an opening 72 adjacent the glass panel 64 with the opening 72 being slightly smaller in size than the cross sectional area of the passageway 68.

The vertical portion 71 extends downwardly from the horizontal portion 69 and terminates in a counterbored portion 73 which is threaded to receive a cylindrical housing 74. A cylinder 75 containing a propellant charge is mounted in the housing 74. This cylinder 75 has a sealed opening 76 at one end which extends into the passageway 68 when the cylindrical housing 74 is threaded into the counterbored portion 73.

A pellet 77 having a pointed end is placed in the horizontal portion 69 of the passageway 68. A spring clip 78 maintains the pellet 77 in a retracted position. An L-shaped handle 79, which is integrally formed with a vertically disposed actuating pin 81, is pivotally connected to the hinge support 66. The actuating pin 81 extends through a vertical opening 82 in the body portion 65 to extend into the passageway 68 with the tip of the pin 81 being in a vertical spaced relationship with the sealed opening 76 of the cylinder 75. A safety pin 83 extends through the handle 79 and the flange 67 of the body portion 65 to prevent the movement of the handle 79 until the safety pin 83 is removed from the impact device 59.

In an emergency, when the breakage of the glass panel 64 is desired, an occupant of the vehicle pulls out the safety pin 83 as seen in dotted lines in FIGURE 6 and pushes the pivotally connected handle 79. This will cause the actuating pin 81 to pierce the sealed opening 76 of the cylinder 75 to release the propellant charge from the cylinder 75 to drive the pointed end of the pellet 77 into the tempered glass panel 64 as best seen in FIGURE 7.

Figure 8:
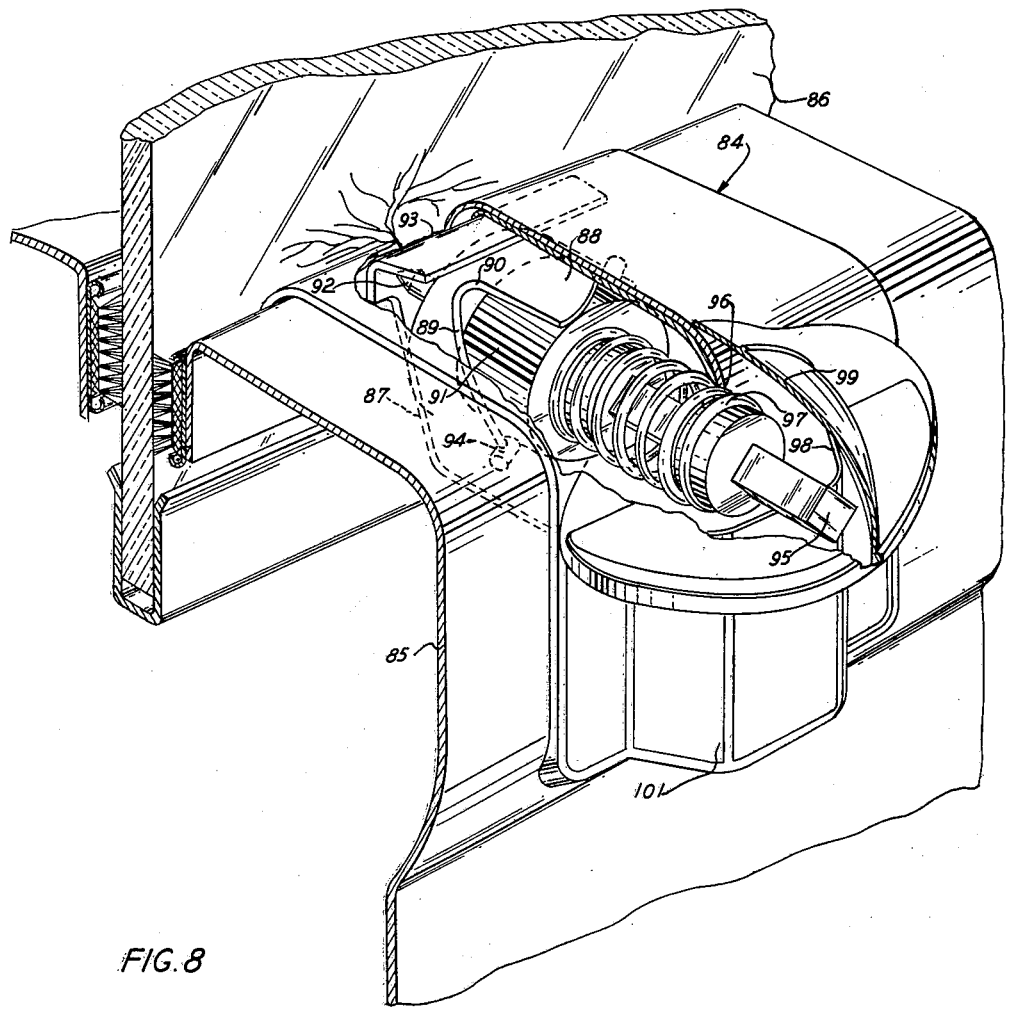
FIGURE 8 is a perspective view partially in section of an impact device of a fourth embodiment of this invention.

In FIGURE 8 is seen an impact device of a further embodiment of this invention generally designated as 84.

The impact device 84 is mounted on an interior garnish molding 85 of a motor vehicle and juxtapositioned to a tempered glass panel 86 mounted in a window of the vehicle. The impact device 84 includes a support plate 87 which is welded to the upper interior surface of the garnish molding 85. A hollow cylinder 88 having a peripheral cam surface 89 and a notch 90 on each side is attached to the support plate 87. A cylindrical plunger 91 which is received in the cylinder 88 is integrally formed with a breaker pin 92. This breaker pin 92 extends from the plunger 91 through an opening 93 in the garnish molding 85 and the support plate 87 so that the pointed end of the breaker pin 92 is positioned adjacent the glass panel 86.

Two follower arms 94 extend outwardly from the plunger 91 and engage the peripheral cam surface 89 of the cylinder 88. The plunger 91 is fixedly coupled to a rotatable square shaft 95 that extends through the interior facing vertical portion 96 of the garnish molding 85. A coil spring 97 encompasses the shaft 95 and is disposed between the plunger 91 and the vertical portion 96 of the garnish molding 85. When a handle 98 is turned to a predetermined position, the plunger 91 and its breaker pin 92 is cammed to a storage position which permits the glass panel 86 to be operated freely without interference from the impact device 84. A spring loaded cover plate 99 is attached to the top edge of the garnish molding 85 and extends inwardly of the vehicle to enclose the handle 98. The cover plate 99 terminates in a U-shaped gripping portion 101 to permit it to be readily gripped by an occupant of the vehicle and lifted upwardly in case of emergency to expose the handle 98.

To operate the impact device 84 in an emergency, the cover plate 99 is first lifted and the handle 98 is then manually rotated 90° by the occupant of the vehicle. This will cause the follower arms 94 to move along the cam surface 89 to force the plunger 91 inwardly to compress the coil spring 97. At the point of maximum compression, the coil spring 97 will uncoil as the follower arms 94 disengage the peripheral cam surface 89 and enter the notches 90 to drive the breaker pin 92 into the glass panel 86 with a sharp blow. This will result in the complete shattering of the glass panel 86.

It can be seen that the various embodiments of the impact device of this invention will provide the occupant of the vehicle with assistance in shattering heat treated glass panels mounted in the windows of motor vehicles. The impact devices of this invention can be readily mounted in juxtaposition to any tempered glass panel in a vehicle enclosure and may be quickly actuated by an occupant of the vehicle in an emergency. The entire glass panel will be completely broken upon its penetration by a pointed object as the highly stressed surface of tempered glass will shatter instantly when a sharp point under impact load penetrates its skin.

The impact devices of this invention are preloaded or armed and require very little effort to be actuated. The various embodiments of the impact devices include a means of preventing their accidental actuation to reduce the tampering with or other misuse of these devices.

It will be understood that the invention is not to be limited to the construction shown and described but that various changes and modifications may be made without departing from the spirit and scope of the invention as defined in the appended claims.

We claim:

1. In combination, a panel formed of a glass material characterized by a tendency to shatter upon penetration by an impact member, a frame mounting said glass panel in a wall of an enclosure, and an impact device supported by said frame in juxtaposition to said glass panel, said impact device comprising an impact member, means supporting said impact member for movement from a normal rest position to a position of impact with said glass panel, and an impact energy imparting means operative to move said impact member from its normal rest position to said position of impact with a force sufficient to cause said impact member to penetrate said glass panel.

2. In combination, an impact breaker device for use in a vehicle, a glass panel mounted in a wall of said vehicle, said panel being formed of a glass material characterized by a tendency to shatter upon penetration of its skin by an impact member, said device comprising a housing mounted on said wall in juxtaposition to said glass panel, an impact member supported by said housing and movable between a normal retracted position remote from said glass panel and a point of penetration of the skin of said glass panel, and impact energy imparting means operative to move said impact member from its normal retracted position to said point of penetration with a sufficient force to penetrate the skin of said glass panel to shatter the latter to provide an emergency opening in the wall of said vehicle.

3. In combination, an impact breaker device for a vehicle body, at least one glass panel mounted in a wall of said vehicle body, said device comprising a housing mounted on said wall adjacent said glass panel, a movable impact member having a striker portion, said impact member being supported by said housing and being movable therein along a path extending from a normal retracted position to a position of penetration of said glass panel by its striker portion, releasable locking means maintaining said impact member in its normal retracted position, and impact energy imparting means operative upon release of said locking means to accelerate said impact member along said path from its normal retracted position to said position of penetration, said striker portion of said impact member upon penetrating said glass panel shattering the latter to provide an egress from said vehicle body.

4. An emergency breaker device for a tempered glass panel mounted in a wall of a motor vehicle, said panel formed of a glass material characterized by a tendency to shatter upon penetration of its skin by an impact member, said device comprising a housing mounted on said wall in juxtaposition to said glass panel, an impact member having a striker portion and an abutment means, said impact member being movable from a normal retracted postion to a point in which said striker portion is capable of penetrating the skin of said glass panel, means biasing said impact member towards said point of penetration of the skin of said glass panel by its striker portion, a releasable pawl means having an abutment means engageable portion, said pawl means portion abutting said aubtment means of said impact member to retain said striker portion in a normal retracted position, release of said pawl means causing the disengagement of its portion from said abutment means to allow said biasing means to move said impact member and its striker portion to the point of penetration of the skin of said glass panel to shatter the latter.

5. An emergency breaker device for a tempered glass panel mounted in a window frame installed in a motor vehicle, said glass panel having the characteristic of shattering upon being penetrated by a pointed object, said device comprising a support plate attached to said window frame, a shaft carried by said support plate, an impact member fixed to said shaft in juxtaposition to said glass panel, said impact member having a pointed portion and being movable from a normal retracted position remote from said glass panel to a point of penetration of said glass panel by said pointed portion, ratchet means fixed to said shaft, and spring means normally biasing said impact member toward said glass panel, a pawl pivotally mounted on said support plate engageable with said ratchet means to retain said impact member in its normal retracted position, said pawl upon pivotal movement being disengaged from said ratchet means to allow said spring means to bias said impact member and its pointed portion into penetration of said glass panel.

6. An emergency breaker device for a tempered glass panel mounted in a window frame installed in a motor vehicle, said glass panel having the characteristic of shattering upon being penetrated by a pointed object, said device comprising a support plate attached to said frame, a shaft carried by said support plate, an impact member mounted on said shaft for movement therewith in juxtaposition to said glass panel, said impact member having a pointed portion movable from a normal retracted position remote from said glass panel to a point of penetration of said glass panel, ratchet means fixedly coupled to said shaft and positioned below said support plate, a first spring means normally biasing said pointed portion toward said glass panel, a pawl pivotally supported on and positioned below said support plate and spaced horizontally from said shaft, said pawl being pivotally movable in case of emergency, a second spring means normally biasing said pawl to hold the latter in engagement with said ratchet means, said pawl upon pivotal movement being disengaged from said ratchet means to allow said first spring means to bias said pointed portion toward said glass panel to effect its penetration by the pointed portion thereby causing said glass panel to be shattered to provide an egress from said motor vehicle.

7. An emergency breaker device for a tempered glass panel mounted in a wall of a motor vehicle comprising a housing mounted on said wall adjacent said glass panel, an impact member having a striker portion, spring means attaching said impact member to said housing, said spring means being adapted to move said impact member and its striker portion from a normal cocked position remote from said glass panel to a point in which said striker portion is capable of penetrating said glass panel, and a movable release means maintaining said impact member in its normal cocked position, said spring means moving said impact member and its striker portion from its normal cocked position to said point of penetration of said glass panel by its striker portion upon movement of said release means to effect the shattering of the glass panel to provide an emergency opening in the wall of said vehicle.

8. An emergency breaker device for a glass panel mounted in a wall of a motor vehicle, said glass panel possessing the characteristic of shattering upon penetration of its skin by a pointed object, said device comprising a housing mounted on said wall in juxtaposition to said glass panel, an elongated impact member having a pointed end portion, guide means extending from said housing, follower means projecting outwardly from said impact member below its pointed portion, spring means having one end attached to said follower means and its other end to said housing, said spring means being adapted to move said impact member and its pointed end portion from its normal cocked position remote from said glass panel to a point in which said pointed end portion is capable of penetrating the skin of said glass panel, and a releasable clip attached to said housing, said clip maintaining said impact member in its normal cocked position when in a nonreleased position, said spring means upon release of said clip moving said follower means along said guide means to drive said impact member from its normal cocked position to the point of penetration of said glass panel by said pointed end portion to cause the glass panel to shatter to provide an emergency opening in the wall of said motor vehicle.

9. An emergency breaker device for a tempered glass panel mounted in a wall of a motor vehicle comprising a support mounted on said wall in juxtaposition to said glass panel, said housing being provided with a passageway terminating in an opening adjacent said glass panel, an impact pellet in said passageway remote from said glass panel, pressure means supported by said housing and in communication with said passageway, and release means for actuating said pressure means, said impact pellet upon actuation of said pressure means by said release means being moved within said passageway through said opening into penetration of said glass panel, said glass panel shattering upon being penetrated by said pellet to provide an emergency opening in the wall of said motor vehicle.

10. An emergency breaker device for a tempered glass panel mounted in a wall of a motor vehicle, said glass panel having the characteristic of shattering upon being penetrated by a sharp object, said device comprising a support mounted on said wall adjacent said glass panel, said housing being provided with a passageway terminating in a first opening adjacent said glass panel, a sharp impact pellet in said passageway remote from said first opening, a cylinder attached to said housing and having a sealed opening extending into said passageway, said cylinder containing a propellant charge, and handle means pivotally attached to said housing and provided with a puncturing means, said puncturing means upon pivotal movement of said handle means puncturing said sealed opening to release said propellant charge into said passageway to propel said impact pellet through said first opening with a sufficient force so that it penetrates said glass panel.

11. An emergency breaker device for a tempered glass panel mounted on a wall of a motor vehicle, said glass panel possessing the characteristic of shattering upon penetration of its skin by a sharp object, said device comprising a support mounted on said wall adjacent said glass panel, said housing being provided with a passageway terminating in a first opening adjacent said glass panel, an impact pellet in said passageway remote from said glass, a cylinder attached to said support and having a sealed opening extending into said passageway, a handle pivotally attached to said housing and having a puncturing means, said puncturing means puncturing said sealed opening of said cylinder upon pivotal movement of said handle to release said propellant charge into said passageway to drive said impact pellet through said first opening into the skin of said glass panel, and safety lock means extending through said support and said handle to prevent pivotal movement of the latter until said safety lock is removed from said handle and said support.

12. An emergency breaker device for a tempered glass panel mounted on a wall of a motor vehicle comprising a housing mounted in said wall adjacent said glass panel, impact means including a rotatable shaft extending through a portion of said housing, a plunger slidable axially on and nonrotatably coupled to said shaft, spring means disposed between said plunger and said portion of said housing, follower means carried by said plunger, and a cam surface attached to said housing, said follower means engaging said cam surface to position said plunger in a storage position, said follower means being maintained in engagement with said cam surface by said spring means upon rotation of said shaft to cause said plunger to axially slide from its storage position to a cocked position thereby compressing said spring means, said follower means being disengaged from said cam surface upon further rotation of said shaft to allow the spring means to expand to force said plunger against said glass panel to penetrate and shatter the latter.

13. An emergency breaker device for a tempered glass panel mounted in a wall of a motor vehicle, said glass panel possessing the characteristic of shattering upon penetration thereof by a pointed object, said device comprising a housing mounted on said wall adjacent said glass panel, an impact means including a rotatable shaft extending through a portion of said housing, a pointed plunger axially slidable on and nonrotatably coupled to said shaft, a coil spring encompassing said shaft and disposed between said plunger and said portion of the housing, a follower means carried by said plunger, and a cylinder attached to said housing and having a diagonally extending peripheral cam surface and a notched portion, said follower means engaging said diagonally extending peripheral cam surface to position said plunger in a storage position, said follower means being maintained in engagement with the diagonally extending peripheral cam surface of said cylinder by said coil spring upon rotation of said shaft to cause said plunger to axially slide from its storage position to a cocked position thereby compressing said coil spring, said follower means upon further rotation of said shaft being disengaged from said diagonally extending peripheral cam surface and entering said notched portion to allow the uncoiling of said coil spring to drive said pointed plunger into penetration of said glass panel.

14. An emergency breaker device for a tempered glass panel mounted in a wall of a motor vehicle, said glass panel possessing the characteristic of shattering upon peneration of its skin by a pointed object, said device comprising a housing mounted on said wall adjacent said glass panel, an impact means including a rotatable shaft having one end portion extending through a portion of said housing, a handle on said one end portion of the shaft, a plunger having a pointed end, said plunger being axially slidable on and nonrotatably coupled to the other end portion of said shaft, a coil spring received on said shaft and disposed between said plunger and said portion of the housing, at least two follower pins carried by said plunger, a cylinder attached to said housing having a number of cam elements corresponding to the number of follower pins in its end surface, said follower pins being maintained in engagement with said cam elements by said coil spring upon rotation of said handle to cause said plunger to axially slide on said shaft thereby positioning the pointed end of the plunger in a cocked position and compressing said coil spring, said follower pins upon further rotation of said shaft being disengaged from said cam elements to permit said coil spring to drive the pointed end of said plunger into the skin of said glass panel, and a removable cover attached to said housing and enclosing said handle to prevent accidental rotation of said shaft.

References Cited in the file of this patent

UNITED STATES PATENTS

| | | |
|---|---|---|
| 2,189,439 | Temple | Feb. 6, 1940 |
| 2,495,971 | Iselin | Jan. 31, 1950 |
| 3,084,705 | Feuer | Apr. 9, 1963 |